US011144604B1

(12) United States Patent
Bourne

(10) Patent No.: US 11,144,604 B1
(45) Date of Patent: *Oct. 12, 2021

(54) AGGREGATED PERFORMANCE REPORTING SYSTEM AND METHOD FOR A DISTRIBUTED COMPUTING ENVIRONMENT

(71) Applicant: VCE Company, LLC, Richardson, TX (US)

(72) Inventor: Geoffrey D. Bourne, Allen, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 609 days.

This patent is subject to a terminal disclaimer.

(21) Appl. No.: 14/802,830

(22) Filed: Jul. 17, 2015

(51) Int. Cl.
 *G06F 16/9535* (2019.01)
 *G06F 16/248* (2019.01)
 *G06F 16/2455* (2019.01)

(52) U.S. Cl.
 CPC ........ *G06F 16/9535* (2019.01); *G06F 16/248* (2019.01); *G06F 16/24566* (2019.01)

(58) Field of Classification Search
 CPC ......... G06F 17/30867; G06F 17/30513; G06F 16/248; G06F 16/9535; G06F 16/24566
 USPC ...................................................... 707/706
 See application file for complete search history.

(56) References Cited

U.S. PATENT DOCUMENTS

| 6,052,694 | A * | 4/2000 | Bromberg | G06F 11/3409 |
| 6,961,794 | B2 * | 11/2005 | Atherton | G06F 11/3409 |
| | | | | 710/301 |
| 7,606,895 | B1 * | 10/2009 | Dini | H04L 12/14 |
| | | | | 709/223 |
| 8,850,313 | B2 * | 9/2014 | Mody | G06F 16/9535 |
| | | | | 715/738 |
| 9,367,803 | B2 * | 6/2016 | Yadav | G06Q 10/00 |
| 2002/0143913 | A1 * | 10/2002 | Sahita | H04L 41/0889 |
| | | | | 709/223 |
| 2003/0191829 | A1 * | 10/2003 | Masters | G06F 11/3414 |
| | | | | 709/223 |
| 2004/0236757 | A1 * | 11/2004 | Caccavale | G06F 11/3442 |
| 2005/0010660 | A1 * | 1/2005 | Vaught | H04L 43/00 |
| | | | | 709/223 |
| 2006/0064619 | A1 * | 3/2006 | Wen | G06F 9/50 |
| | | | | 714/734 |
| 2006/0106883 | A1 * | 5/2006 | Blumenau | G06Q 10/06 |
| 2008/0027957 | A1 * | 1/2008 | Bruckner | G06F 16/244 |
| 2008/0082528 | A1 * | 4/2008 | Bonzi | G06F 16/9535 |

(Continued)

*Primary Examiner* — Belix M Ortiz Ditren
*Assistant Examiner* — Nargis Sultana
(74) *Attorney, Agent, or Firm* — Polsinelli PC

(57) ABSTRACT

An aggregated performance reporting system includes a computing system in communication with a database that stores element records associated with the elements of a distributed computing environment. The computing system stores instructions that are executed to receive a search term from a user interface, and identify a count of each element type that matches the search term. The instructions then identify one or more aggregated performance indicators that are associated with each element type, issue a request to the database to retrieve those element records having the identified element types, calculate the aggregated performance indicators using parametric information included in the retrieved element records, and facilitate the display of the calculated aggregated performance indicators on a display.

14 Claims, 10 Drawing Sheets

(56) References Cited

U.S. PATENT DOCUMENTS

| | | | | |
|---|---|---|---|---|
| 2008/0114788 A1* | 5/2008 | Abraham | ............ | G06F 16/9024 |
| 2009/0276565 A1* | 11/2009 | Fujibayashi | ........... | G06F 3/0613 |
| | | | | 711/112 |
| 2011/0208739 A1* | 8/2011 | Weissman | ............. | G06F 16/245 |
| | | | | 707/737 |
| 2012/0278725 A1* | 11/2012 | Gordon | ............ | H04N 21/25891 |
| | | | | 715/738 |
| 2013/0124669 A1* | 5/2013 | Anderson | ........... | H04L 43/0876 |
| | | | | 709/217 |
| 2014/0188946 A1* | 7/2014 | Hartman | ............. | G06F 16/9024 |
| | | | | 707/805 |
| 2014/0344328 A1* | 11/2014 | Chakra | ............... | H04L 67/2819 |
| | | | | 709/203 |
| 2015/0088898 A1* | 3/2015 | Branch | ............. | G06F 16/24578 |
| | | | | 707/741 |
| 2015/0149611 A1* | 5/2015 | Lissack | ................... | H04L 43/16 |
| | | | | 709/224 |
| 2015/0212663 A1* | 7/2015 | Papale | ................. | G06F 16/248 |
| | | | | 715/762 |
| 2015/0227624 A1* | 8/2015 | Busch | ............... | G06F 16/24578 |
| | | | | 707/728 |
| 2015/0254248 A1* | 9/2015 | Burns | ............... | G06F 16/24578 |
| | | | | 707/749 |
| 2015/0363711 A1* | 12/2015 | Raman | .................. | G06F 16/283 |
| | | | | 705/7.11 |
| 2016/0085772 A1* | 3/2016 | Vermeulen | ............... | G06F 16/21 |
| | | | | 707/615 |
| 2016/0085801 A1* | 3/2016 | Hellbusch | ........... | G06F 16/2365 |
| | | | | 707/737 |
| 2017/0006483 A1* | 1/2017 | Attanasio | .............. | H04L 67/125 |

\* cited by examiner

440

ELEMENT DISPLAY SCREEN

| Element Detail | Element Type | Serial No. | Location | STATUS |
|---|---|---|---|---|
| O | disk | SN02lk-XXX | Dallas, Tx | NORMAL |
| O | disk | SN02lk-XXXXX | Dallas, Tx | FAILED |
| O | disk | NTWK3-XXX | Dallas, Tx | NORMAL |
| O | disk | SN04-XXXX | Dallas, Tx | NORMAL |
| O | disk | HD05-XXXXX | Durham, NC | NORMAL |
| O | disk | HD-XXXXX | Durham, NC | NORMAL |

AGGREGATED PERFORMANCE REPORTING SYSTEM AND METHOD FOR A DISTRIBUTED COMPUTING ENVIRONMENT

TECHNICAL FIELD

Aspects of the present disclosure relate to computing devices and, in particular, to an aggregated performance reporting system and method for a distributed computing environment.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, distribute computing environments that may include virtual computing environments were introduced and that provide a standardized package of components combined into a single, optimized computing solution. These distributed computing environments typically offer a relatively high level of customization for applications by distributing the workload of applications over multiple resources while alleviating the need to manage specific physical requirements of the underlying physical structure on which the resources are executed.

SUMMARY

According to one aspect of the present disclosure, an aggregated performance reporting system includes a computing system in communication with a database that stores element records associated with the elements of a distributed computing environment. The computing system stores instructions that are executed to receive a search term from a user interface, and identify a count of each element type that matches the search term. The instructions then identify one or more aggregated performance indicators that are associated with each element type, issue a request to the database to retrieve those element records having the identified element types, calculate the aggregated performance indicators using parametric information included in the retrieved element records, and facilitate the display of the calculated aggregated performance indicators on a display.

BRIEF DESCRIPTION OF THE DRAWINGS

The various features and advantages of the technology of the present disclosure will be apparent from the following description of particular embodiments of those technologies, as illustrated in the accompanying drawings. In the drawings the like reference characters may refer to the same parts throughout the different views. The drawings depict only typical embodiments of the present disclosure and, therefore, are not to be considered limiting in scope.

FIGS. 4A through 4D illustrate example screenshots that may be displayed by the aggregated performance reporting application for receiving user input and displaying aggregated performance indicators associated with the received user input according to one embodiment of the present disclosure.

DETAILED DESCRIPTION

Figure 1A:
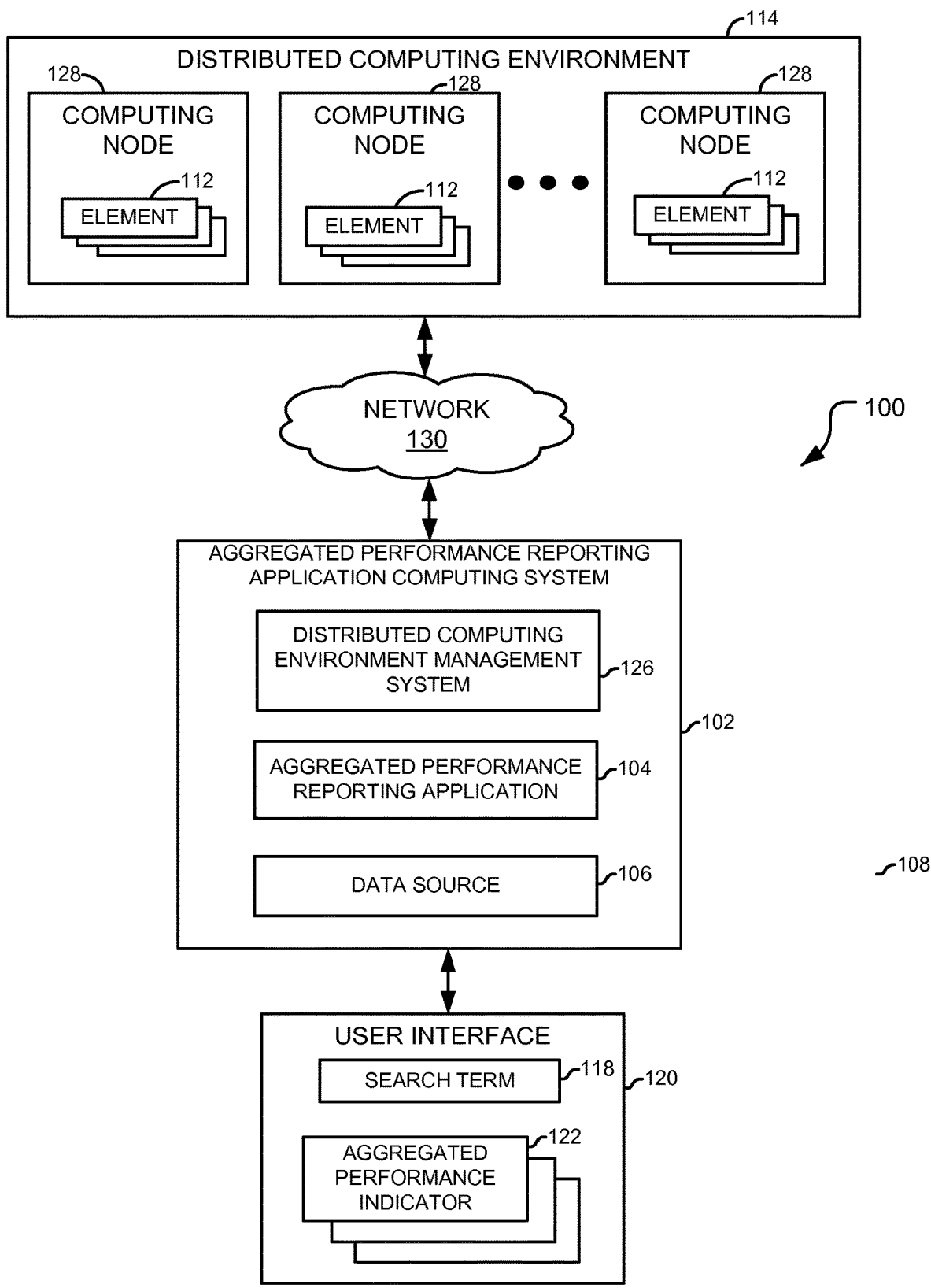
FIG. 1A illustrates an example aggregated performance reporting system for a distributed computing environment according to one embodiment of the present disclosure.

Embodiments of the present disclosure describe an aggregated performance reporting system for distributed computing environments that provides performance metrics for aggregated groupings of certain elements in which the particular grouping of each aggregated set of elements may be selected via user input in real-time. Because traditional processes for calculating aggregated performance metrics for the elements of a distributed computing environment have often required pre-defined groupings of certain elements, these processes have been cumbersome to use with multiple elements of a distributed computing environment that may change often during their operation, such as when additional elements are added to handle expanding workload levels, removed due to reduced workload levels, or modified for various reasons, such as due to maintenance performed on the elements. Embodiments of the aggregated performance reporting system provides a solution to this problem, among other problems, by providing a search function that allows user selection of certain grouping of elements so that aggregated performance metrics may be obtained in an ad-hoc manner and in real-time. Additionally, the search function may provide for iterative search queries such that the aggregated performance metrics may be obtained for certain specific groupings of elements in a relatively concise, accurate manner.

Distributed computing environments have provided an efficient platform for the execution of relatively large and complex applications and services requiring a relatively high level of availability and performance. For example, an application may be deployed on a distributed computing environment by allocating multiple elements of the distributed computing environment to handle its workload without substantial regard to how those elements are managed and/or maintained. Additionally, the distributed computing environment may provide a relatively high level of availability for the deployed application by automatically migrating the use of certain elements to other elements when those elements fail. Nevertheless, this flexible deployment of elements often causes an undue burden for monitoring the performance of a particular application or group of applications. Conventional techniques for monitoring the performance of certain groupings of elements has been provided, but they use pre-defined groupings of elements that require continual updating so that aggregated performance metrics may accurately portray the health of the elements used to execute their respective applications. These pre-defined groupings typically involve storing information about which elements are used to execute a particular application, but this stored information must be updated each time an element is added or removed. Additionally, parametric information obtained from any new elements may require translation, thus further complicating any aggregated performance metrics that may be obtained using these conventional techniques.

Figure 1B:
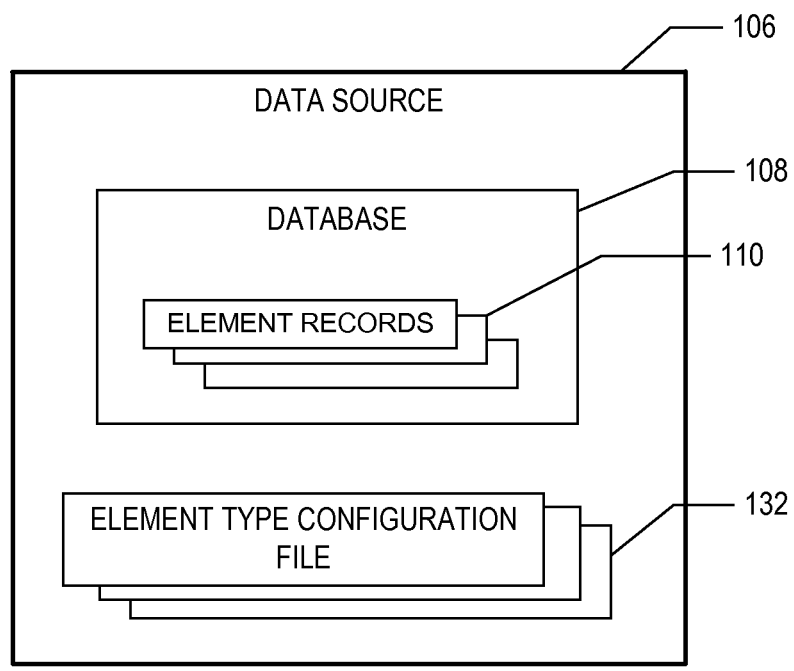
FIG. 1B illustrates an example data source that may be used with the aggregated performance reporting system according to one embodiment of the present disclosure.

FIGS. 1A and 1B illustrate an example aggregated performance reporting system 100 according to one embodiment of the present disclosure. The system 100 includes an aggregated performance reporting application computing system 102 having an aggregated performance reporting application 104 and a data source 106 that stores, among other things, a database 108 including element records 110 associated with the elements 112 of a distributed computing environment 114. As will be described in detail herein below, the aggregated performance reporting application 104 receives one or more search terms 118 from a user interface 120, identifies those element records 110 that match the received search term 118, and obtains those element records 110 for calculating one or more aggregated performance indicators 122 that may be subsequently displayed for view by a user.

In general, the application 104 utilizes the database 108 to store element records 110 associated with the elements 112 in the distributed computing environment 114, and accesses those element records 110 according to search terms 118 provided from a user to filter the element records 110 such that aggregated performance indicators 122 may be calculated against a certain desired grouping of elements 112. The application 104 populates the database 108 with element records 110 at an ongoing basis, such as via a discovery process that is performed at regular, ongoing intervals. Additionally, each element record 110 includes various forms of information, such as identification information to facilitate its identification from among numerous other element records 110, and parametric information associated with one or more performance parameters of its associated element 112 from which the aggregated performance indicators 122 may be calculated.

Embodiments of the aggregated performance reporting system 100 may provide certain advantages over conventional techniques for reporting aggregated performance characteristics for certain grouping of certain elements of a distributed computing environment. For example, conventional aggregated performance reporting techniques often utilize databases that include element records with pre-defined schemas. As such, when distributed computing environments expand to include additional elements, or certain elements are replaced with other elements having element records formatted with other schemas, the schemas of the records associated with these newly deployed elements often needs to be modified. Therefore, the databases used to provide aggregated performance indicators for groupings of the elements of distributed computing environments have heretofore remained difficult to maintain. Worse, this problem is exacerbated when used in relatively large distributed computing environments, such as in data centers that may include over 100,000 elements, and whose quantity and type of elements often changes on a frequent basis. Embodiments of the present disclosure provide a solution to this problem by filtering the gamut of available element records 110 of a database 108 against one or more user supplied search terms to obtain a select grouping of element records that may be customized according the user's needs. Thereafter, aggregated performance indicators may be generated for the selected group of element records based upon their element type. In this manner, aggregated performance indicators may be generated in real-time or near real-time without the need to continually maintain the database that stores element records for the various elements of the distributed computing environment.

In one embodiment, the database 108 comprises a NoSQL database in which records, commonly referred to as documents, may be generated and stored therein without the need for any specified schema. For example, the NoSQL database may be administered by a NoSQL search engine that generates a NoSQL document associated with each element, and provides for access to each document using standard search notation, such as with alphanumeric search phrases and/or other criteria that may be used to access various forms of information about the documents stored in the database. In a particular example, the NoSQL database utilizes an Elasticsearch™ search engine, which is released under an open source license from the Apache Software Foundation in Forest Hill, Md.

The Elasticsearch™ search engine stores information about each element as a Javascript object notation (JSON) document (e.g., an element record 110) in the database 108 in a manner that does not require any particular schema. Thus, the schema of the newly added element record 110 does not need to be integrated with the schema of existing element records 110 in the database 108. Additionally, the Elasticsearch™ search engine is a multi-tenant search engine having a RESTful interface for efficient operation across a network, such as a proprietary communication network of the distributed computing environment, or a publicly available network, such as the Internet.

The application 104 may communicate directly with the elements 112 in the distributed computing environment 114 to receive their information, or it may communicate with the elements 112 through an intermediary mechanism, such as a distributed computing environment management system 126. The distributed computing environment management system 126 may be any type, such as one that manages the operation of the elements 112 of the distributed computing environment 114, which may include, for example, provisioning elements, de-provisioning elements, configuring one or more operational parameters on each element 112, and the like. Any suitable type of distributed computing environment management system 126 may be implemented. In one embodiment, the distributed computing environment management system 126 includes a vSphere™ software suite that is available from VMware Corporation, which is headquartered in Palo Alto, Calif.

The elements 112 may be provided by one or more computing nodes 128 configured in the distributed computing environment 114. In most cases, the elements 112 generally refer to computing devices that perform some function for the overall operation of the distributed computing environment 114, while the nodes 128 generally refer to physically distinct structures (e.g., computing racks) that house the elements 112. Examples of such computing devices may include, for example, blade computing devices, laptop or notebook computers, workstations, tablet computers, and the like, while the computing nodes 128 may include complex computing structures, such as clusters, unified computing systems, fabric-based computing systems, and dynamic infrastructures. The computing nodes 128 may also include other communication devices, such as switches, routers, firewall appliances, or other communication device that facilitates communication among multiple other computing nodes 128. Each computing node 128 may also include a distributed computing system, such as one implemented with one or more storage arrays, network element, compute devices, and/or any combination thereof. For example, a computing node 128 may comprise one or more converged infrastructures configured in the distributed computing environment 114.

The aggregated performance reporting application computing system 102 and the distributed computing environment 114 communicate with one another using a communications network 130. Nevertheless, the aggregated performance reporting application computing system 102 and the distributed computing environment 114 may communicate with one another in any suitable manner. For example, the aggregated performance reporting application computing system 102 and the distributed computing environment 114 may communicate with each other using wireless and/or wired communications. In one embodiment, the aggregated performance reporting application computing system 102 and the distributed computing environment 114 communicates with one another using a communication network 130, such as the Internet, an intranet, or another wired and/or wireless communication network. In another embodiment, the aggregated performance reporting application computing system 102 and the distributed computing environment 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the aggregated performance reporting application computing system 102 and the distributed computing environment 114 may communicate with one another without the use of a separate and a distinct network.

Figure 2A:
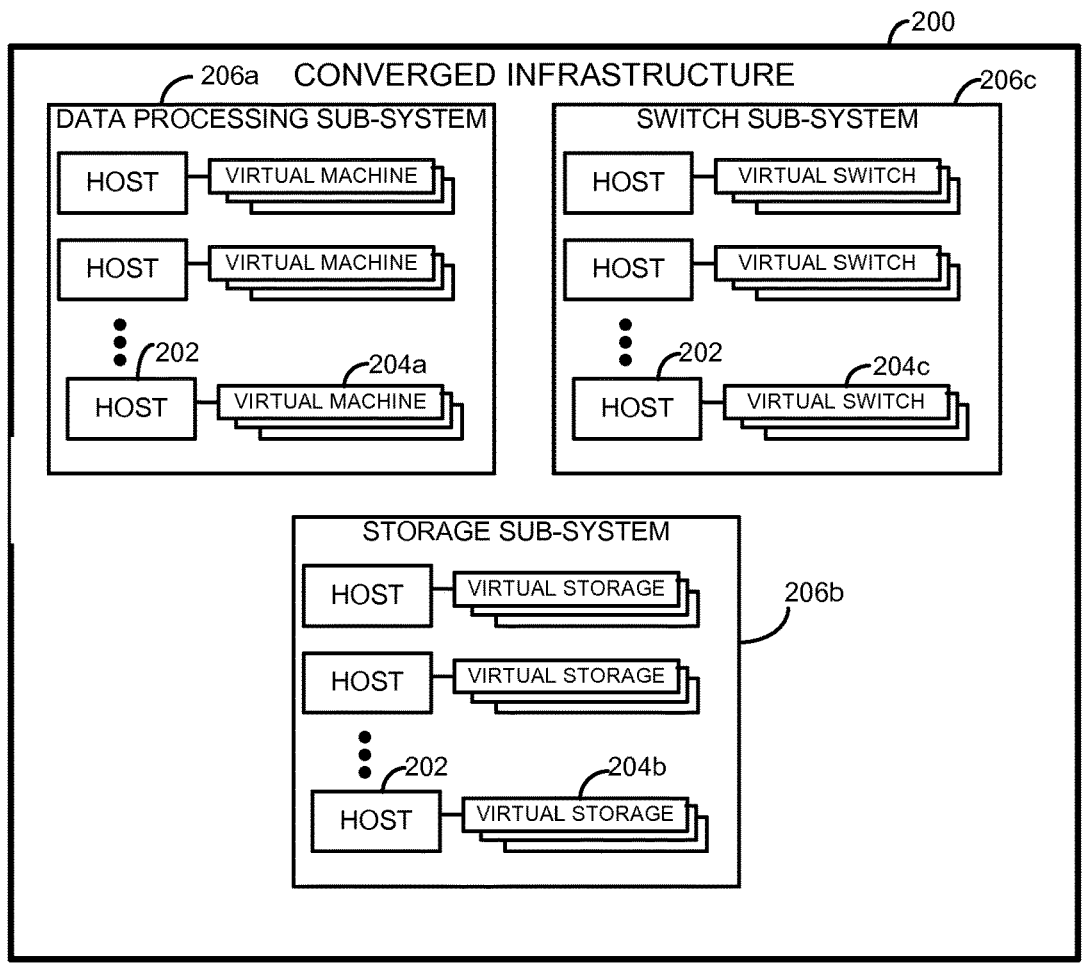
FIGS. 2A and 2B illustrate an example converged infrastructure that may be implemented as a computing node of the distributed computing environment according to one embodiment of the present disclosure.
Figure 2B:
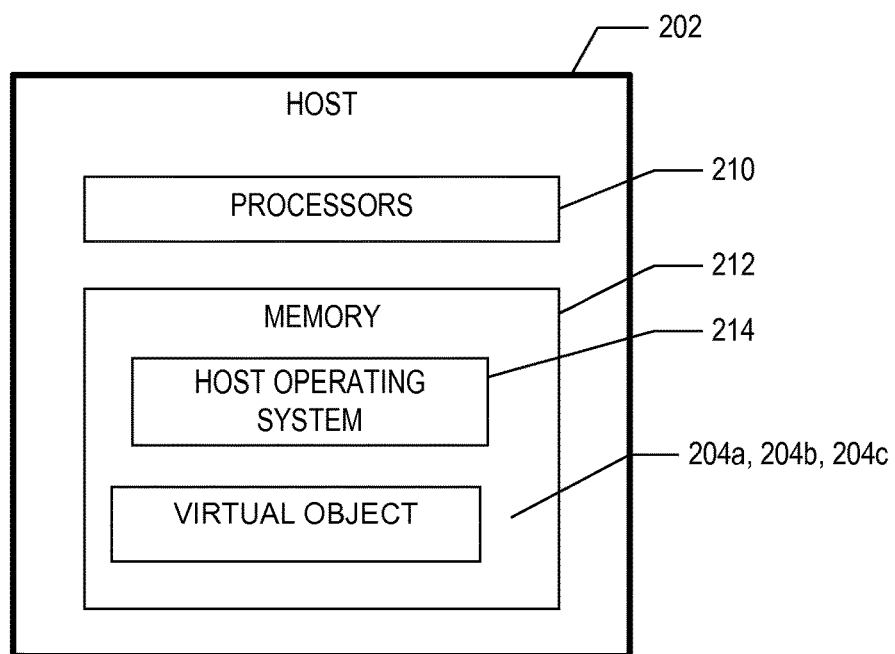

FIGS. 2A and 2B illustrate an example converged infrastructure 200 that may be implemented as a computing node 128 of the distributed computing environment 114 according to the teachings of the present disclosure. For example, multiple converged infrastructures 200 as described herein may be configured to communicate with one another using a communication network, such as the communication network 130 to form at least a portion of the distributed computing environment 114.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the aggregated performance reporting system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
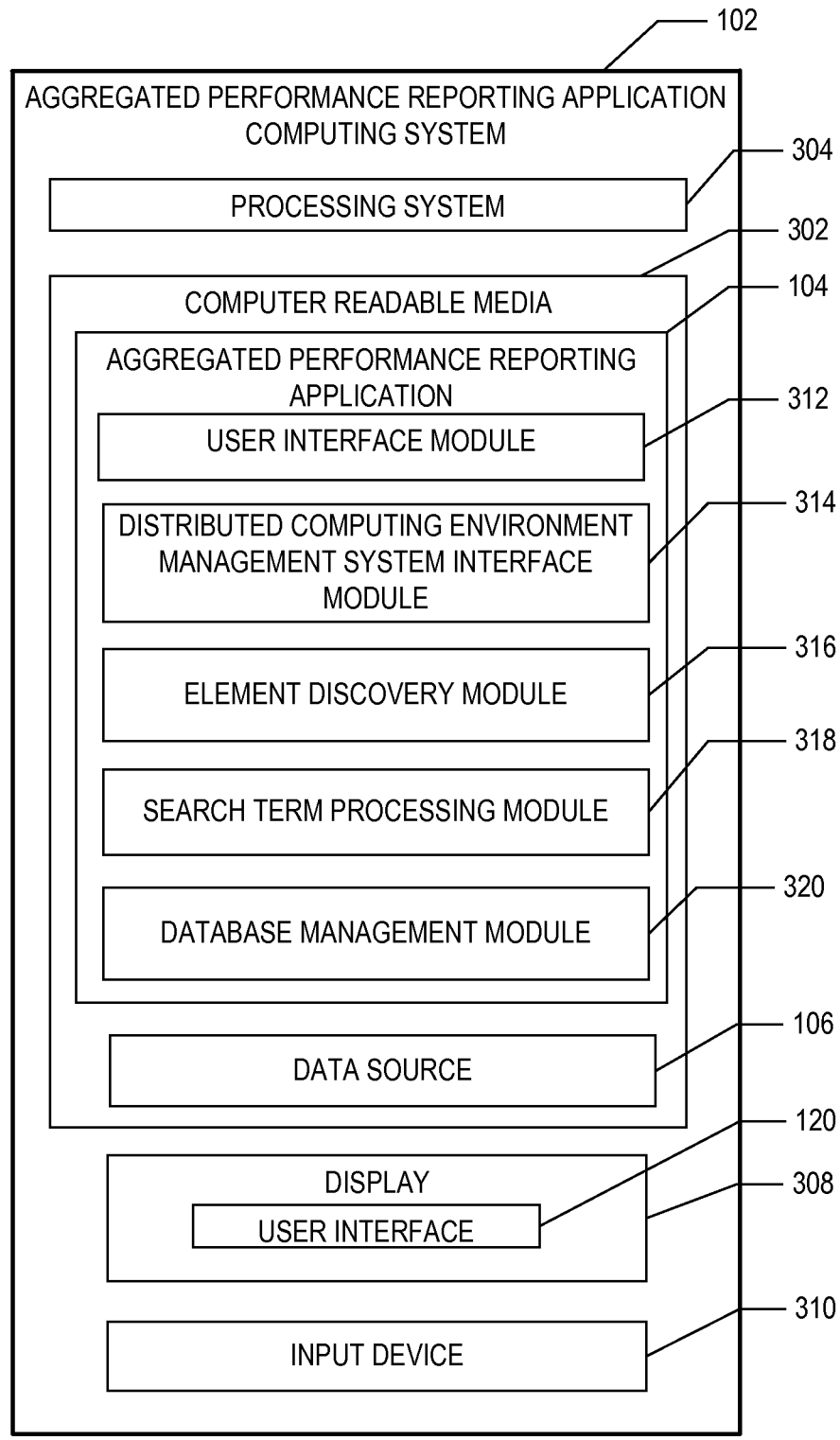
FIG. 3 illustrates a block diagram of an example aggregated performance reporting application executed on the aggregated performance reporting application computing system according to one embodiment of the present disclosure.

Referring now in more detail to FIG. 3, a block diagram of an example aggregated performance reporting application 104 executed on the aggregated performance reporting application computing system 102, is depicted according to one aspect of the present disclosure. The aggregated performance reporting application 104 is stored in a computer readable media 302 and executed on a processing system 304 of the computing system 102. The processing system 304 is hardware. The computing system 102 may include any type of computing system, such as one or more management computing systems, personal computers, mobile computers and/or other mobile devices, and other hosts.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the aggregated performance reporting application computing system 102 also provides the user interface 120, such as a graphical user interface (GUI) or a command line interface (CLI), which is displayed on a display 308, such as a computer monitor, for displaying data. The aggregated performance reporting application computing system 102 also includes an input device 310, such as a keyboard or a pointing device (e.g., a mouse, trackball, pen, or touch screen) to enter data into or interact with the user interface 120. According to one aspect, the aggregated performance reporting application 104 includes instructions or modules that are executable by the processing system 304 as will be described in detail herein below.

Figure 4A:
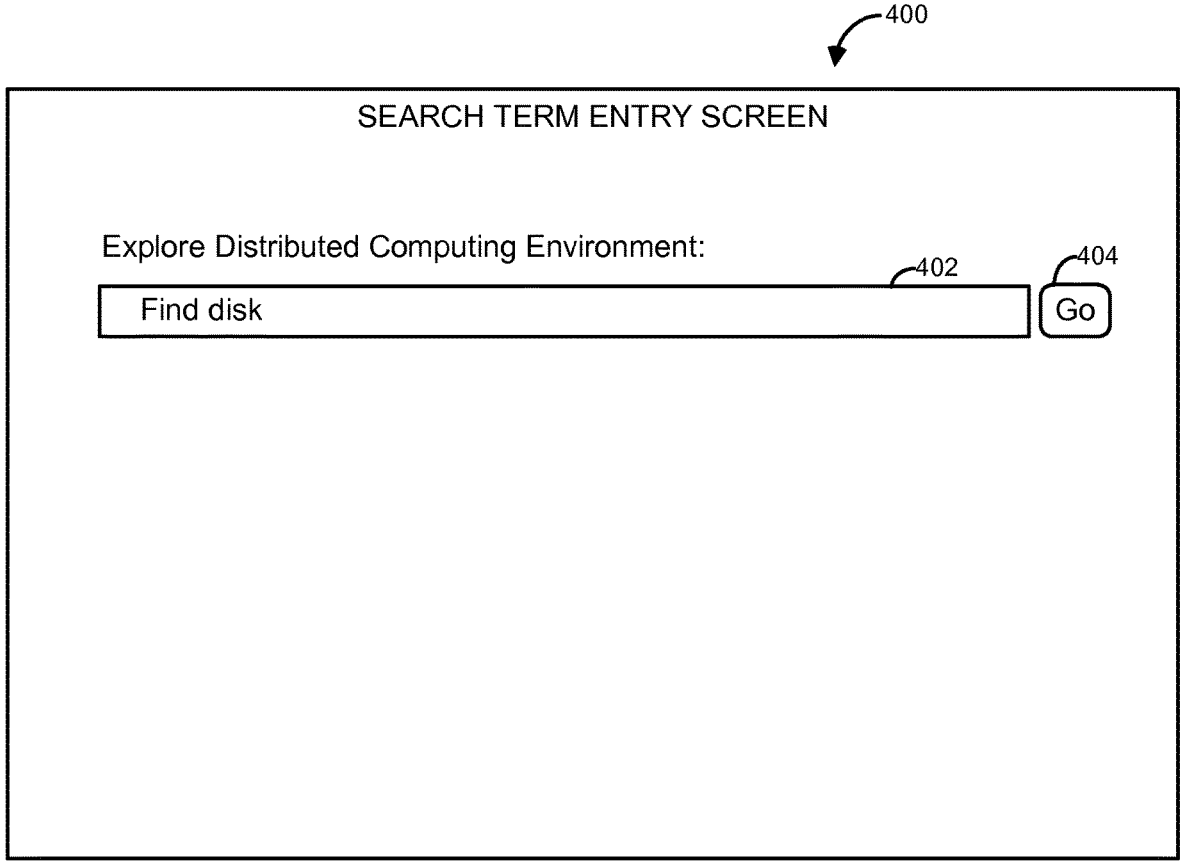
Figure 4B:
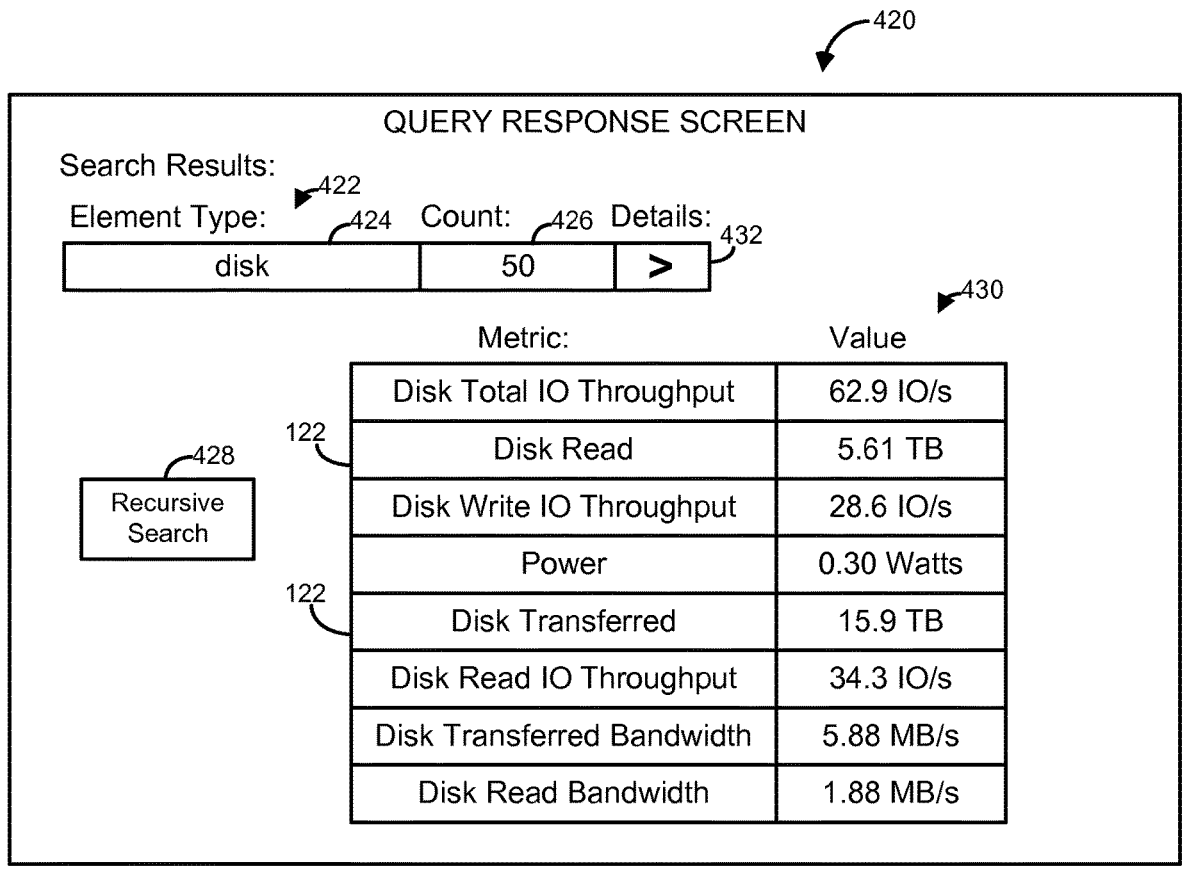
Figure 4D:
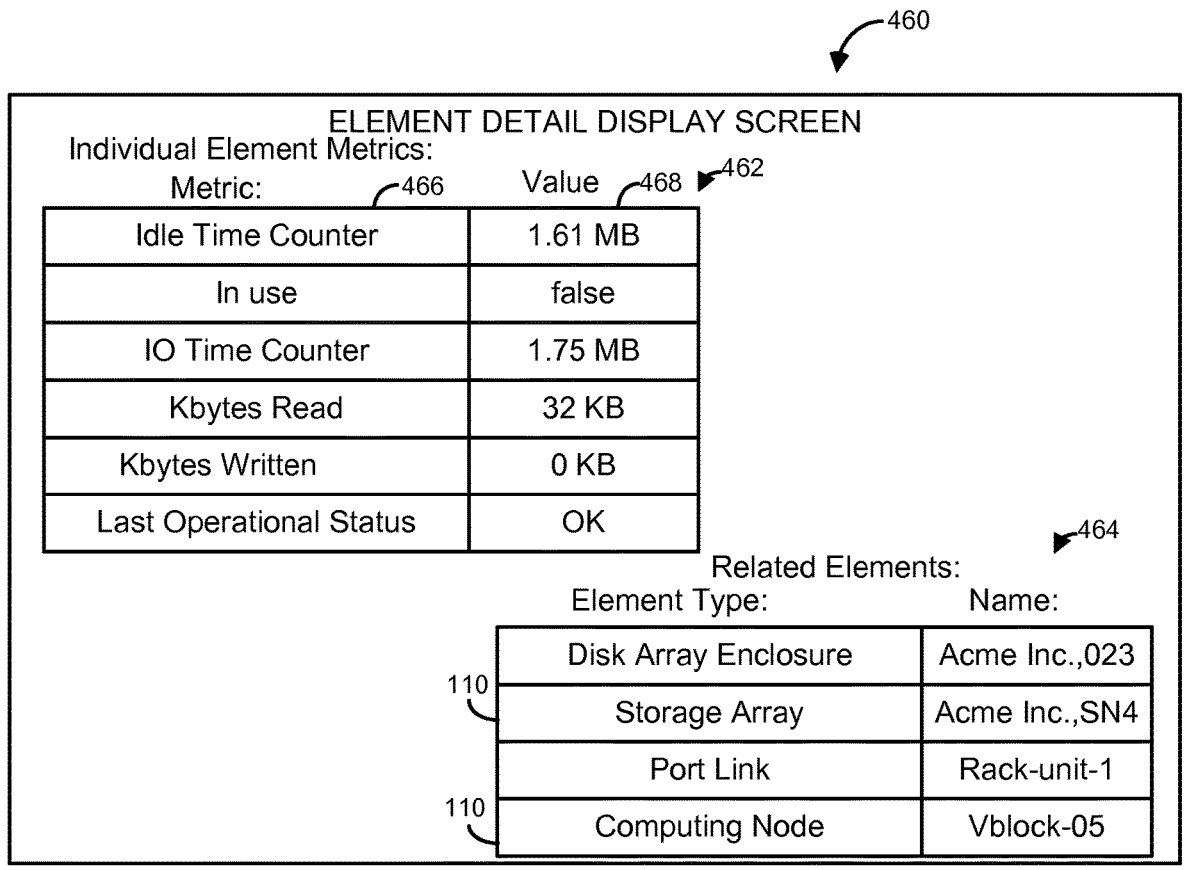

A user interface module 312 generates the user interface 120 to facilitate receipt of input data and/or output data from or to a user. The user interface module 312 may display information to, and receive user information from the user in any suitable form, such as via a graphical user interface (GUI) or a command line interface (CLI). In one embodiment, the user interface module 312 may display an entry field for receiving a search term from the user as shown in FIG. 4A, and one or more other screens for displaying a response the entered search term such as shown in FIGS. 4B through 4D. Nevertheless, other embodiments contemplate that the user interface module 312 may display any type and number of input fields for receiving user input and displaying responses to the user input. For example, the user interface module 312 may display multiple entry fields to receive multiple search terms from the user along with one or more other entry fields for receiving user input on how the fields are to be combined, such as logic for combining multiple search terms using one or more Boolean operators.

A distributed computing environment management system interface module 314 provides an interface to the distributed computing environment management system 126 for transmitting and receiving information about the distributed computing environment 114, and/or other information associated with operation of the system. For example, the distributed computing environment management system interface module 314 may communicate with the distributed computing environment management system 126 to receive information about each element 112 in the distributed computing environment 114 to be used for generating the element records 110 that are stored in the database 108. The information may include identification information that may be used to query the element directly to receive parametric information that may be stored in the element records, or alternatively; the information may include some, most, or all parametric information that may be stored in the element records.

An element discovery module 316 performs a discovery process to obtain information associated with each element 114 in the distributed computing environment 114 and store the obtained element information element records 110 in the database 108. For example, the element discovery module 314 may communicate with one or more element managers configured on each computing node 128 to obtain the element information. Examples of element managers that may be implemented with embodiments of the present disclosure include a Cisco Unified Computing System (UCS) manager provided by Cisco Systems, Inc., of San Jose, Calif., and a VMware Virtual Center provided by VMware Corporation, of Palo Alto, Calif. For another example, the element discovery module 314 may communicate directly with each element 114, such as by issuing broadcast messages requesting that each element 114 respond with identifying information indicating their presence, type, and/or any related parametric information.

In one embodiment, the element discovery module 314 may perform the discovery process on an ongoing, periodic basis so that the element records 110 may be maintained in an up-to-date condition. For example, the element discovery module 314 may poll one or more element managers to determine whether any elements 112 have been added, deleted, and/or modified, and if so, perform a discovery process with those elements 112 and update their information in the element records 110. As another example, the element managers may be configured to automatically notify the element discovery module 314 whenever an element 112 is added, deleted, and/or modified such that the element discovery module 314 is triggered to perform a discovery process on those elements 114.

A search term processing module 318 processes search terms 118 obtained from the user interface module 312 to manage the generation of aggregate performance indicators 122, and display of the generated aggregate performance indicators 122 on the user interface 120 of the display 308. For example, upon receipt of one or more search terms 118 from the user interface module 312, the search term processing module 318 may query the database 108 to obtain relevant information for generating the aggregate performance indicators 122. Thereafter, when the aggregate performance indicators 122 are generated, the search term processing module 318 may communicate with the user interface 120 for displaying the generated aggregated performance indicators 122 on the user interface 120. In one embodiment, the search term processing module 318 communicates with a commercial-off-the-shelf (COTS) search engine to query the database 108, and receive response to those queries. In other embodiments, the search term processing module 318 may communicate directly with the database 108 to manage the element records 110 and/or receive element records 110.

A database management module 320 manages various functions of the database, such as formatting information about each element to generate the element records 110 that are stored in the database 108, updating information in each element record 110, deleting obsolete element records 110, and the like. In one embodiment, the database management module 320 includes an ElasticSearch™ search engine that creates and manages element records 110 using a schema-free JSON format, and has a RESTful interface for communication over a network. Nevertheless, the database management module 320 may utilize any suitable type of search engine without departing from the spirit and scope of the present disclosure.

It should be appreciated that the modules described herein are provided only as examples, and that the aggregated performance reporting application 104 may have different modules, additional modules, or fewer modules than those described herein. For example, one or more modules as described in FIG. 3 may be combined into a single module. As another example, certain modules described herein may be encoded on, and executed on other computing devices, such as on one of the hosts 202 of a converged infrastructure 200 as described above with reference to FIGS. 2A and 2B.

FIGS. 4A through 4C illustrate example screenshots that may be displayed by the aggregated performance reporting application 104 for receiving input from a user interface for generating aggregate performance indicators 122 that may be displayed on a display, such as the user interface 120 of FIG. 1. In general, FIG. 4A is a search term entry screen 400 that may be used to receive one or more search terms from the user, FIG. 4B is a query response screen 420 for displaying aggregate performance indicators 122 that have been generated by the application 104, FIG. 4C is an element display screen 440 for displaying information about the element records 110 used to formulate the aggregate performance indicators 122, and FIG. 4D is a detailed element display screen 460 for displaying detailed information about each element record 110 that was used to formulate the aggregate performance indicators 122.

Referring initially to FIG. 4A, the search term entry screen 400 includes an entry field 402 for entering one or more search terms, and a 'go' button 404 for submitting the entered search terms to the application 104. As shown, the search term 'find disk' has been entered in the entry field 402; nevertheless, it should be understood that any free form text string may be entered into the entry field 400. The entry field 402 supports entry of a single search term or the entry of multiple search terms that are separated by one or more Boolean operators, such as 'AND', 'OR', 'ANDNOT', 'ORNOT', and the like. Additionally the entry field 402 supports entry of a phrase including a structure sequence of multiple words, such as "compute array devices." Once the search term(s) have been entered, the 'go' button 404 may be selected for submitting the search term(s) to the application 104.

Once the search term(s) have been submitted, the query response screen 420 (FIG. 4B) may be displayed. The query response screen 420 includes an element summary portion 422 having an element type field 424 indicating an element type of the element records 110 that matched the search term(s), a count field 426 indicating a quantity of the element records 110 having that element type, and a 'details' field 432. Although only one element type is shown in the present example query response screen 420, the element summary portion 422 may include multiple element types. For example, certain computing nodes may include various types of disks, such as those used for mass storage (e.g., element type is a mass storage disk) as well as those that may be used to store configuration information for a particular sub-system, such as a blade array or a switch array (e.g., element type is a configuration disk). In such a case, the element summary portion 422 may include two element types (e.g., mass storage disk and configuration disk) and an associated count value for each.

The query response screen 420 also includes a 'recursive search' button 428 that when selected by the user, causes the application 104 to again display the search term entry screen 400 for receiving one or more additional search terms from the user. Use of the 'recursive search' button 428 may be useful for cases in which the user desires to further filter the element records 110 to obtain a relatively more customized view of the aggregate performance indicators 122 of certain types of element records 110. For example, the user may wish to obtain aggregate performance indicators 122 for all disks at one particular location. However, an initial search for the aggregate performance indicators 122 related to 'disks' shows aggregate performance indicators 122 related to all disks regardless of location. Therefore, the user may select the 'recursive search' button 428 to enter another search term including the desired location (e.g., Dallas, Tex.) such that another search may be performed and aggregate performance indicators 122 generated for only the disks located at Dallas, Tex.

The query response screen 420 also includes an aggregated performance indicator display portion 430 that displays the aggregated performance indicators 122 associated with the element type displayed in the element summary portion 422 along with their related parametric values. As shown, the aggregated performance indicators 122 include a 'disk total IO throughput' aggregated performance indicator, a 'disk read' aggregated performance indicator, a 'disk write IO throughput' aggregated performance indicator, a 'power' aggregated performance indicator, a 'disk transferred' aggregated performance indicator, a 'disk read IO throughput' aggregated performance indicator, a 'disk transferred bandwidth' aggregated performance indicator, and a 'disk read bandwidth' aggregated performance indicator. Nevertheless, it should be understood that the aggregate performance indicators 122 displayed by the application 104 may include additional, fewer, or different types aggregate performance indicators 122 that what are displayed herein.

When the 'details' field 432 of the summary display portion 422 is selected by the user, the element display screen 440 (FIG. 4C) may be displayed by the application 104. In general, the element display screen 440 displays a list of the element records 110 that were used to generate the aggregate performance indicators 122 that have been displayed by the query response screen 420. The element display screen 440 includes an element record list 442 in which the element records 110 are arranged in rows and various parameters associated with each element record 110 are arranged in columns. The element record list 442 includes an 'element detail' column 444a, an 'element type' column 444b, a 'serial number' column 444c, a 'location' column 444d, and a 'status' column 444e. The 'element type' column 444b indicates the element type of its respective element record 110. The 'serial number' column 444c indicates a serial number associated with each element record 110 and is essentially a unique identifier associated with its respective element record 110. The 'location' column 444d indicates the location that the element associated with the element record 110 is located at, while the 'status' column 444e indicates whether its respective element 112 is operating state or is in a failed state. Although the example element record list 442 shown herein has an 'element type' column 444b, a 'serial number' column 444c, a 'location' column 444d, and a 'status' column 444e, other example element record lists may include additional, fewer, or different types of parameters than shown above.

The 'element detail' column 444a includes radio buttons for each element record 110 such that, when selected by the user, causes the application 104 to generate an element detail display screen 460 to be displayed as shown in FIG. 4D. In general, the element detail display screen 460 displays detailed information about the element associated with its respective element record 110. Whereas the aggregated performance indicator display portion 430 of the query response screen 420 displays performance indicators that have been aggregated from multiple element records 110, the element detail display screen 460 displays information about a single element record 110. Such a feature may be useful for users that wish to identify particular element records 110 that may adversely or beneficially affect the aggregate performance indicators 122 displayed in the aggregated performance indicator display portion 430 of the query response screen 420. For example, if a particular aggregate performance indicator 122 displayed in the aggregated performance indicator display portion 430 is worse than expected, the user may use the information provided in the element detail display screen 460 to identify those element records 110 that have adversely affected the bad aggregate performance indicator 122.

The element detail display screen 460 includes an individual element metrics portion 462 and a related elements portion 464. The element metrics portion 462 includes several parameters 466 along with their respective parametric values 468. As shown, the parameters include an 'idle time counter' parameter, an 'in use' parameter, an 'IO time counter' parameter, a 'Kbytes read' parameter, a 'Kbytes written' parameter, a 'last operational status' parameter. The 'idle time counter' parameter indicates a cumulative amount of time that the disk has been idle. The 'in use' parameter is generally a complementary value to the 'idle time counter' parameter, and indicates a cumulative amount of time that the disk has been actively used. The 'IO time counter' parameter indicates a cumulative amount of time that the disk has been accessed by other elements in the distributed computing environment 114. The 'Kbytes read' parameter indicates a cumulative amount of data in Kilo-bytes that have been read from the disk, while the 'Kbytes written' parameter indicates a cumulative amount of data in Kilo-bytes that have been read from the disk. The 'last operational status' parameter indicates a last known status (e.g., normal, failed, etc.) for that disk. The element metrics portion 462 may include additional, fewer, or different types of parameters than what is shown and described herein. Additionally, although the parameters described above generally pertain to disk drive storage devices, other embodiments contemplate that other types of parameters may be implemented in the element metrics portion 462 of the element detail display screen 460.

The related elements portion 464 displays other element records 110 that may be related to the element record 110 whose details are displayed in the element metrics portion 462. Such a feature may be particularly useful for various reasons. For example, the related elements portion 464 may aid in identifying a particular array enclosure or other sub-system that the present element record is part of. Additionally, the related elements portion 464 may aid in identifying any other elements that may have adversely affected the operation of the present element record 110. For example, if the element record 110 is suffering from an inordinately high level of IO time (e.g., a relatively high 'IO time counter' parameter value), identification of other element records 110 related to that element record may be further examined to aid in determining the root cause of the relatively high IO time.

Although FIGS. 4A through 4C illustrate example screens that may be used for receiving user input for generating customized aggregate performance indicators 122 based on certain grouping of element records 110, the application 104 may display additional, fewer, or different entry screens without departing from the spirit and scope of the present disclosure. For example, the application 104 may display other screens for facilitating management of individual elements 112, such as one that provides for configuration of certain parameters (e.g., allocated memory, quantity of processors, configuration of any ports, etc.) based upon the parametric values displayed by the application 104.

Figure 5:
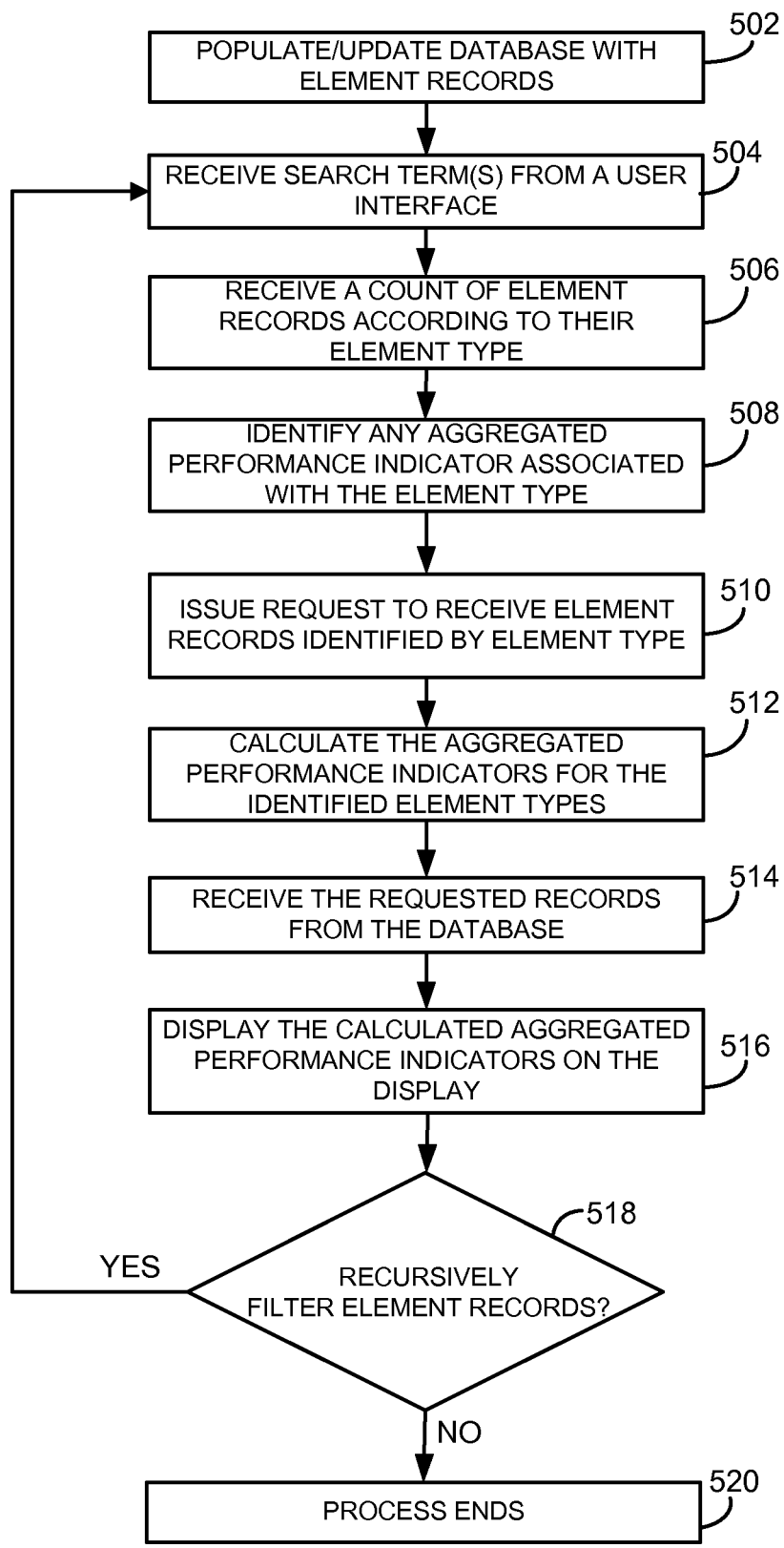
FIG. 5 illustrates an example process that is performed by the aggregated performance reporting system according to one embodiment of the present disclosure.

FIG. 5 illustrates an example process 500 that is performed by the application 104 for receiving input from a user interface for generating aggregate performance indicators 122 that may be displayed on a display.

In step 502, the application 104 populates and/or updates the database 108 with element records 110 associated with the elements 112 of a distributed computing environment 114. For example, the application 104 may populate a new database that has not been heretofore populated with the element records 110, or if the database has been previously populated, the application 104 may update an existing database with the element records 110 on an ongoing (e.g., periodic) basis such that the parameters and their respective reflect the most recent status of each element 112 of the distributed computing environment 114.

In one embodiment, the application 104 communicates directly with each element 112 to receive its parametric values. In another embodiment, the application 104 communicates indirectly with each element 112 using an element manager associated with each element 112 to obtain its parametric values.

In step 504, the application 104 receives one or more search terms from the user interface 120. If more than one search term are received, it may apply one or more Boolean operators (e.g., OR, AND, ANDNOT, ORNOT, etc.) between each search term.

In step 506, the application 104 receives a count of any matching element records according to their element type. That is, for all element records that have matched the received search term(s), their element type may be identified and a count made for each identified element type. In one embodiment, the application 104 may communicate with the database to retrieve such information, or it may communicate with a database search engine such as the Elasticsearch™ search engine to retrieve the element type and count information.

In step 508, the application 104 identifies any aggregated performance indicators that are associated with each retrieved element type. The aggregated performance indicators generally refer to a specified calculation (e.g., summation, average, difference, etc.) that is to be performed on the parametric information included in the element records. In one embodiment, the aggregate performance indicators 122 may be received from an element type configuration file 132 associated with its respective element type and stored in the data source 106. In another embodiment, the aggregate performance indicators 122 may be received from the user in real-time through the user interface 120.

In step 510, the application 104 issues a request to receive element records 110 associated with each identified element type from which the aggregate performance indicators 122 for each element type using parametric information included in the received element records 110 are calculated in step 512. For example, a disk element type may include a capacity level aggregated performance indicator in its configuration file 132 in which the capacity level is the total amount of used storage divided by the total amount of available storage available by all of the elements having the disk element type. When the application 104 encounters a disk element type, it may calculate the total amount of storage used by all elements having the disk element type, and divide this value by the total amount of available storage in all of the disks to obtain the capacity level aggregate performance indicator 122. Other types of aggregate performance indicators 122 may be calculated in a similar manner.

The aggregate performance indicators 122 may be calculated by the application 104 and/or by an external source, such as a search engine associated with the database 108. For example, the application 104 may, along with issuance of a request to receive certain element records, include a request for a search engine, such as the Elasticsearch™ search engine, to perform the calculations on certain parametric values included in the element records. Alternatively, the application 104 may obtain relevant parametric information from the received element records 110 for each aggregate performance indicator 122, and calculate the aggregate performance indicator 122 using the parametric information.

In step 514, the application 104 receives the requested element records 110 in step 512, and displays the calculated aggregate performance indicators 122 on the user interface 120 in step 516.

In step 518, the application 104 determines whether the currently obtained element records 110 are to be further filtered using one or more additional search terms. For example, the application 104 may receive user input via the 'recursive search' button 428 on the query response screen 420 that instructs the application 104 to receive additional search term(s). If the application 104 receives instructions to recursively filter the identified element records 110, processing continues at step 502 to receive additional search terms from the user. However, if the application 104 determines that no recursive filtering of the obtained element records 110 are to be provided, processing continues at step 520 in with the process ends.

Although FIG. 5 describes one example of a process that may be performed by the system for calculating and displaying aggregated performance indicators for the elements of a distributed computing environment, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
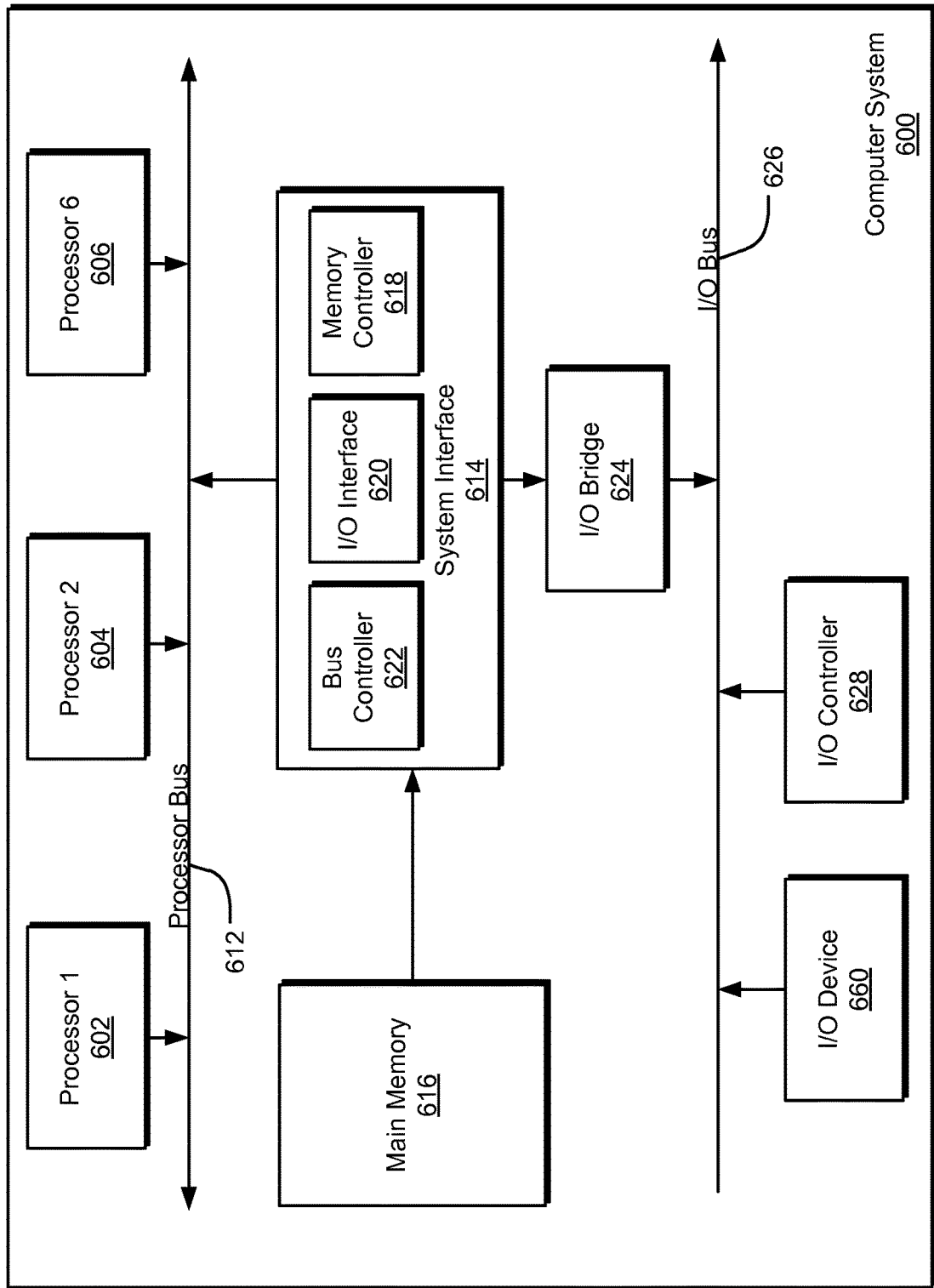
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An aggregated performance reporting method for a distributed computing environment, the method comprising:
    performing, by a processor, a discovery process to populate a database with a plurality of element records, each element record associated with one or more of a plurality of elements of a distributed computing environment and an element type, each of the plurality of elements comprising a computing device performing a function for an overall operation of the distributed computing environment;
    communicating, by the processor, with the plurality of elements of the distributed computing environment to receive parametric information for each of the plurality of elements;
    storing, by the processor, the received parametric information for each of the plurality of elements in the plurality of element records in a database;
    generating a user interface comprising a search screen and a query response screen, the user interface displayed to a user;
    receiving, by the processor, a search term from the user interface through the search screen;
    identifying, by the processor, one or more element types associated with element records of the plurality of element records that match the search term, wherein each of the one or more element types identifies a type of a computing device included in the distributed computing environment;
    determining a count of the element records associated with the one or more element types;
    identifying, by the processor and from an element type configuration file stored in the database, one or more aggregated performance indicators that are associated with each element type having a positive count, the element type configuration file correlating the one or more aggregated performance indicators with the one or more element types corresponding to one or more of the plurality of computing devices of the distributed computing environment;
    issuing, by the processor, a request to the database to retrieve the matching element records having the identified one or more element types;
    calculating, by the processor, the aggregated performance indicators using the parametric information included in the retrieved element records; and
    populating the query response screen with the search term and the aggregated performance indicators, each aggregated performance indicator of the query response screen comprising an indicator label and an associated indicator performance value.

2. The aggregated performance reporting method of claim 1, further comprising identifying the count of each of the one or more element types by, prior to issuing the request, querying the database to retrieve the count for each of the one or more element types.

3. The aggregated performance reporting method of claim 1, further comprising issuing the request to a database search engine that maintains the plurality of element records without any specified schema in the database.

4. The aggregated performance reporting method of claim 3, wherein the plurality of element records are stored in the database as Javascript object notation (JSON) documents.

5. The aggregated performance reporting method of claim 1, further comprising:
    performing a recursive search to further filter the retrieved element records from which the aggregated performance indicators are calculated; and
    facilitating the display of the calculated aggregated performance indicators associated with the filtered element records on a display.

6. An aggregated performance reporting system for a distributed computing environment, the system comprising:
    a computing system in communication with a distributed computing environment comprising a plurality of elements, each of the plurality of elements comprising a computing device performing a function for an overall operation of the distributed computing environment, and a database that stores element records associated with corresponding elements of the distributed computing environment, each element record including an element type indicating a type of its respective element, the computing system comprising at least one hardware processor and at least one memory to store instructions that are configured to, when executed by the at least one processor to:
    perform a discovery process to populate the database with the plurality of element records;

communicate with the plurality of elements of the distributed computing environment to receive parametric information for each of the plurality of elements;

store the receiving parametric information for each of the plurality of elements in a plurality of element records in the database;

generate a user interface comprising a search screen and a query response screen, the user interface displayed to a user;

receive a search term from the user interface through the search screen;

identify one or more element types associated with element records of the plurality of element records that match the search term, wherein each of the one or more element types identifies a type of a computing device included in the distributed computing environment;

determine a count of the element records associated with the one or more element types;

identify, from an element type configuration file stored in the database, one or more aggregated performance indicators that are associated with each element type having a positive count, the element type configuration file correlating the one or more aggregated performance indicators with the one or more element types corresponding to one or more of the plurality of computing devices of the distributed computing environment;

issue a request to the database to retrieve the matching element records having the identified element types;

calculate the aggregated performance indicators using the parametric information included in the retrieved element records; and populate the query response screen with the search term and the aggregated performance indicators, each aggregated performance indicator of the query response screen comprising an indicator label and an associated indicator performance value.

7. The aggregated performance reporting system of claim 6, wherein the instructions are further configured to identify the count of each of the one or more element types by, prior to issuing the request, querying the database to retrieve the count for each of the one or more element types.

8. The aggregated performance reporting system of claim 6, wherein the instructions are further configured to issue the request to a database search engine that maintains the plurality of element records without any specified schema in the database.

9. The aggregated performance reporting system of claim 8, wherein the plurality of element records are stored in the database as Javascript object notation (JSON) documents.

10. The aggregated performance reporting system of claim 6, wherein the instructions are further configured to:

perform a recursive search to further filter the retrieved element records from which the aggregated performance indicators are calculated; and facilitate the display of the calculated aggregated performance indicators associated with the filtered records on a display.

11. A non-transitory, computer readable medium storing instructions that, when executed by at least one hardware processor, cause the at least one hardware processor to:

perform a discovery process to populate a database with a plurality of element records, each element record associated with one or more of a plurality of elements of a distributed computing environment and an element type, each of the plurality of elements comprising a computing device performing a function for an overall operation of the distributed computing environment;

communicate with the plurality of elements of the distributed computing environment to receive parametric information for each of the plurality of elements;

store the received parametric information for each of the plurality of elements in the plurality of element records in the database;

generate a user interface comprising a search screen and a query response screen, the user interface displayed to a user;

receive search term from user interface through the search screen;

identify one or more element types associated with element records of the plurality of element records that match the search term, wherein each of the one or more element types identifies a type of a computing device included in the distributed computing environment;

determine a count of the element records associated with the one or more element types;

identify, from an element type configuration file stored in the database, one or more aggregated performance indicators that are associated with each element type having a positive count, the element type configuration file correlating the one or more aggregated performance indicators with the one or more element types corresponding to one or more of the plurality of computing devices of the distributed computing environment;

issue a request to the database to retrieve the matching element records having the identified element types;

calculate the aggregated performance indicators using parametric information included in the retrieved element records; and populate the query response screen with the search term and the aggregated performance indicators, each aggregated performance indicator of the query response screen comprising an indicator label and an associated indicator performance value.

12. The non-transitory, computer readable medium of claim 11, further storing instructions that cause the at least one hardware processor to identify the count of each of the one or more element types by, prior to issuing the request, querying the database to retrieve the count for each of the one or more element types.

13. The non-transitory, computer readable medium of claim 11, further storing instructions that cause the at least one hardware processor to issue the request to a database search engine that maintains the plurality of element records without any specified schema in the database.

14. The non-transitory, computer readable medium of claim 11, further storing instructions that cause the at least one hardware processor to:

perform a recursive search to further filter the retrieved element records from which the aggregated performance indicators are calculated; and facilitate the display of the calculated aggregated performance indicators on a display.

\* \* \* \* \*